United States Patent [19]
Shaw

[11] 3,823,818
[45] July 16, 1974

[54] BELTED PREFORMS

[75] Inventor: Charles H. Shaw, Bloomfield, Conn.

[73] Assignee: Monsanto Company, St. Louis, Mo.

[22] Filed: Jan. 24, 1972

[21] Appl. No.: 220,218

[52] U.S. Cl................. 206/390, 206/344, 206/443, 206/479, 215/1 C
[51] Int. Cl....................... B65d 73/00, B65d 85/20
[58] Field of Search........... 206/56 R, 56 A, 56 AC, 206/56 DF; 215/1 C

[56] References Cited
UNITED STATES PATENTS

| | | | |
|---|---|---|---|
| 3,311,230 | 3/1967 | Wonneman | 206/56 A |
| 3,357,761 | 12/1967 | Langas et al. | 206/56 DF X |
| 3,599,280 | 8/1971 | Rosenkranz et al. | 206/56 A UX |
| 3,608,017 | 9/1971 | Cines | 215/1 C X |
| 3,625,352 | 12/1971 | Perkins | 206/56 DF |

Primary Examiner—William I. Price
Assistant Examiner—Steven E. Lipman
Attorney, Agent, or Firm—Michael J. Murphy

[57] ABSTRACT

Preforms used in blow molding plastic containers are sequentially affixed at spaced locations along a disposable web. As the preforms are affixed to the web, the composite is wound on a suitable storage reel which is housed in an enclosed shipping and storage container. Thereafter, the belted preforms may at any convenient time and place be fed to a finishing unit where they are removed from the web by any suitable means, such as by severing the web or by application of heat. Each preform is then fed to a blow molding station where the fabrication of the containers is completed.

1 Claim, 5 Drawing Figures

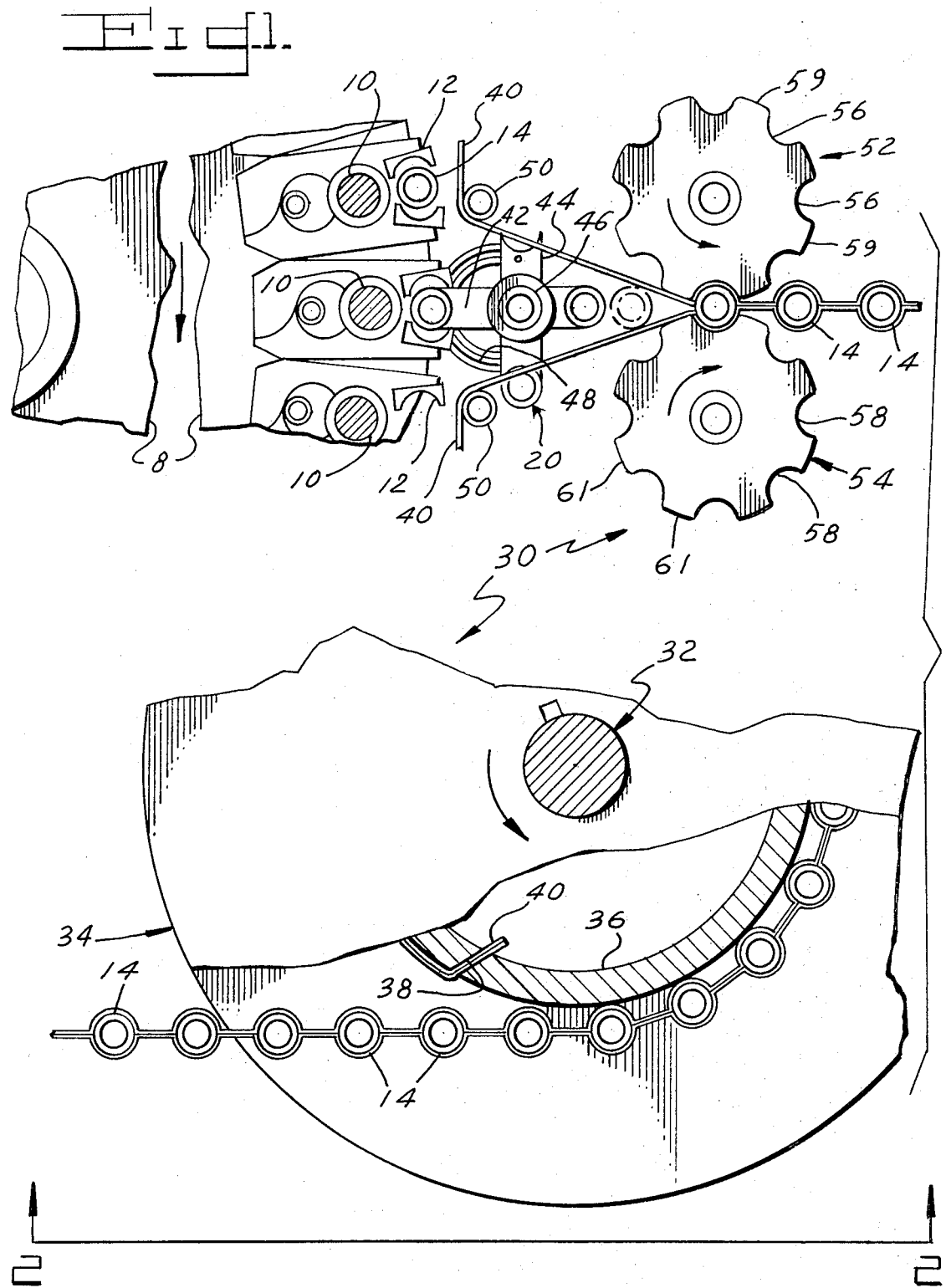

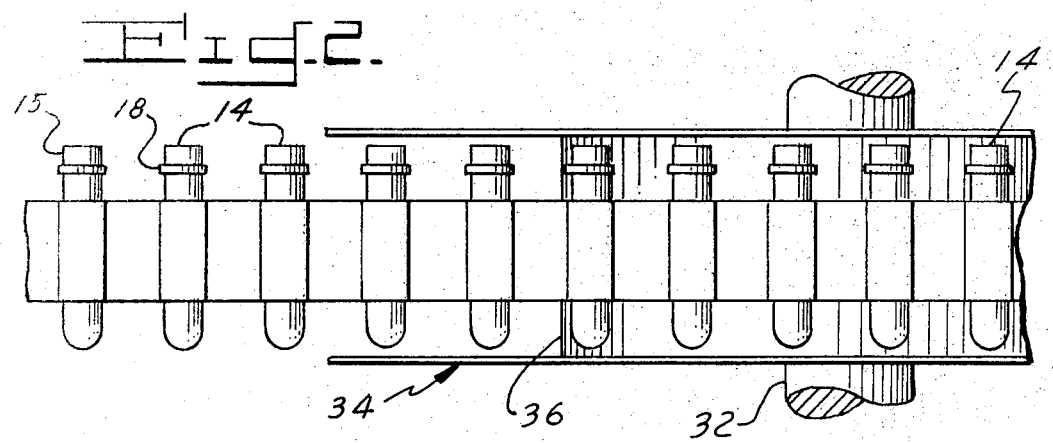
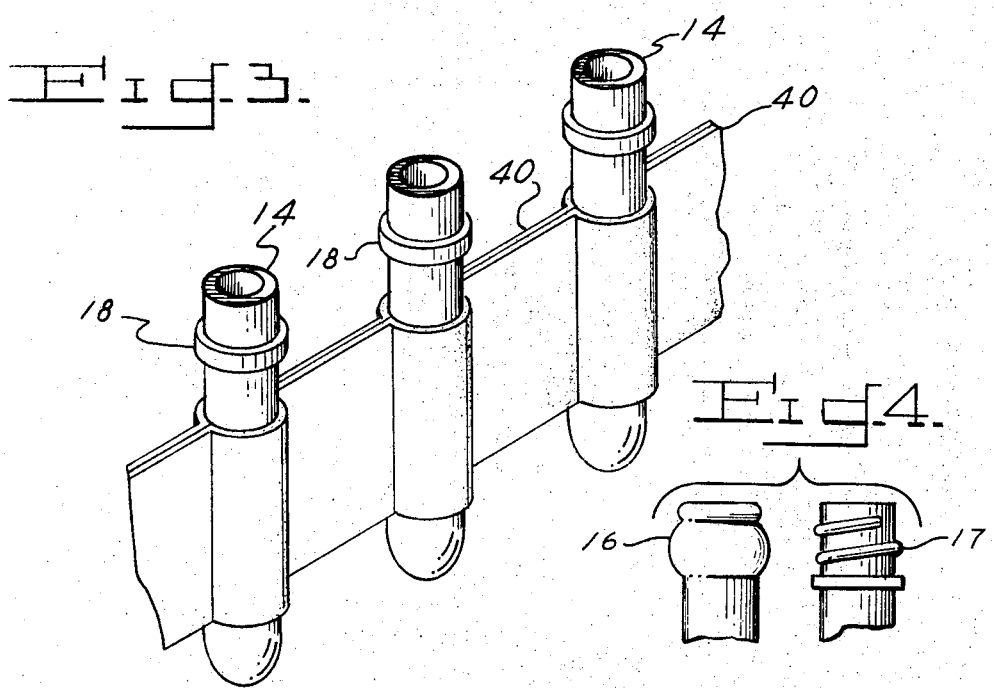
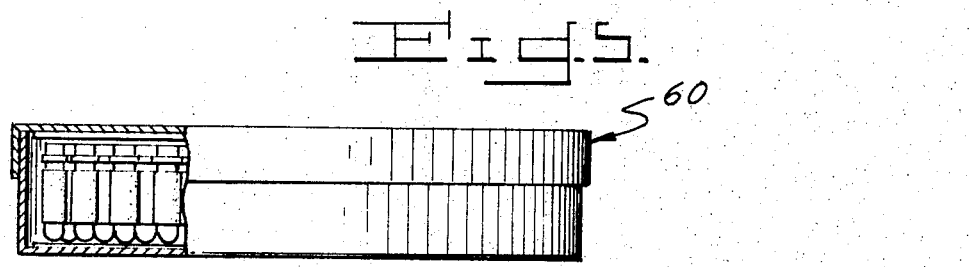

BELTED PREFORMS

BACKGROUND

As is well known, thermoplastic containers, such as bottles, may be blow molded from extruded tubular parison sections. Frequently, as disclosed in U.S. Pat. No. 3,599,280, the extruded parison is severed into appropriate lengths and allowed to cool, whereupon the upper and/or lower end portions of the tubular body may be initially or later molded to close the bottom end and form the neck portion of the final blown bottle. Such a cooled, severed tubular blank with either unfinished ends or a closed and a molded end is hereinafter referred to as a "preform." The preforms may be shipped to satellite molding locations which may be constructed at minimum cost because relatively heavy and complicated extrusion equipment is not required. At such molding locations the preforms are merely heated and transferred into blow molds in which they are inflated to their final configuration.

This latter type of two step process has the advantage over the more conventional "in line" type of forming where the article is finish molded directly from the hot extruded tubular blank in that the blow molding operation can be independently carried out at temperatures below the normal molten extrusion temperature of the polymer and at a rate approaching that of high speed downstream filling equipment which is generally considerably faster than that at which the material may be extruded. Therefore, for purposes of the present invention, the blow molding operation as to time, location and production rates is independent of the time, location and production rate of preforms from the tubular extrudate.

The principal object of this invention is to provide a method and means for handling and storing preforms which are to be blow molded into finished containers, and particularly preforms in which one end has been finish formed into the final configuration of the article.

Another object of this invention is to provide as an article of manufacture, belted preforms wherein each preform, after it is formed, is belted and wound on a storage drum.

A further object of this invention is to provide a method for handling preforms wherein the belted preforms may be fed to a blow molding station whereat they are stripped sequentially from the carrying belt and heated and blown in the conventional fashion.

The above and other objects and advantages of this invention will be more readily apparent from the following description read in reference to the accompanying drawings, in which:

FIG. 1 is a diagrammatical plan view showing one type of apparatus which may be used in carrying out this invention;

FIG. 2 is a section taken along line 2—2 of FIG. 1;

FIG. 3 is a perspective view on an enlarged scale showing a portion of the belted preforms embodying this invention;

FIG. 4 is an elevational view showing alternative preform configurations; and

FIG. 5 is a sectional, elevational view on reduced scale showing drumwound, belted preforms disposed in a storage container.

Referring in detail to the drawings, in FIG. 1 is shown one type of apparatus for forming and feeding preforms. The apparatus comprises a rotating preshaping table 8 which includes a plurality of circumferentially spaced spindles 10, each of which extends outwardly of the table and on which is carried a pair of holding jaws 12, which serve to releasably hold a tubular portion 14. The preshaping table and the jaws 12 operate as disclosed in U.S. Pat. No. 3,599,280. Tubular portions of synthetic thermoplastic material used in the fabrication of the preforms 14 are sequentially fed to the jaws 12 at a point, not shown, just below the portion of the table shown in the drawings. The clamping jaws 12 grip the tubular portion approximately about its center whereby its upper and lower ends are exposed for heating and molding to form a preform 14 having a closed bottom end and a molded upper end, which upper end conforms to the finished configuration of the article to be eventually blow molded, and does not require any additional shaping within the blow mold. Thus, the upper end of preform 14 may be smooth as illustrated at 15 in FIG. 2 or may be formed into any of the conventional bottle neck finishes for accepting a particular type of closure, e.g., a crown type finish as shown at 16 in FIG. 4, or a threaded finish as shown at 17 in FIG. 4 for eventually cooperating with a threaded closure. Ring 18 on a preform is for the purpose of cooperating with an opposed mating depression within the blow mold to support the preform within the mold as it is blown. The rotary table, for about half its periphery, is surrounded by a suitable heating means, not shown. After the neck and bottom portions of the preforms are molded, the jaws are opened as shown in FIG. 1 and a transfer device, such as shown generally at 20, may be utilized to transfer the completed preforms 14 to a belting mechanism shown generally at 30 in FIG. 1.

Though a separate operation is illustrated in FIG. 1 for shaping the opposing ends of an initial tubular starting length at ambient temperature, it should be understood that such lengths may be loaded directly into the handling mechanism to be described hereafter, e.g., by transfer device 20, without having been initially operated on, such end shaping taking place subsequently at the blow molding station. Likewise, alternative methods to that illustrated in FIG. 1, e.g., injection or blow molding, may be used to shape the initial tubular lengths into preforms 14, preferably while at an elevated temperature supplied by the extrusion operation.

As shown, the belting mechanism includes a driven shaft or spindle 32 by which a reel or spool 34 is rotatably driven. The spool 34 includes a hub portion shown generally at 36 provided with slit 38 for retaining the free ends of the webs 40 which are preferably made of synthetic plastic, whereby the webs are wound about the hub 36 and through the belting rolls 52 and 54 to be hereinafter described.

The transfer device, as more fully disclosed in U.S. Pat. No. 3,599,280, includes a pair of cross arms 42 and 44 pivotable about a pin 46. A cam or groove 48 is disposed eccentrically with respect to the pin 46 and guide means extending from the arms 42 and 44 follow the groove 48 to control the movement of arms 42 and 44 so as to pick up sequentially preforms 14 from the open jaws 12 of the preshaping table 8 and deliver each to the belting rolls.

The webs 40 may be drawn from supply drums, not shown, over a pair of spaced guide rolls 50 disposed outwardly of the preform transfer means 20. The paths of the webs 40 are clear of the transfer means and converge to contact opposite surface portions of the preforms 14 whereby the preforms are carried into the nip of a pair of spaced opposed rotatable wheels 52 and 54. Such contact should occur along the body of the preforms beneath support ring 18 to insure that the latter does not interfere with the smoothness of the belting operation. Rotation of the wheels 52 and 54 is synchronized with the rotation of the winder drum 34, so that each groove 56 formed in the rim of the wheel 52 registers with a corresponding groove 58 in the wheel 54. Each of the wheels 52 and 54 also includes a land portion 59 and 61 respectively between each pair of adjacent grooves which also register or mesh, either in surface-to-surface contact or in sufficiently close proximity to press opposite surface portions of the webs 40 together whereby the webs will be bonded together at the interval between adjacent pairs of preforms, as shown in the drawings, particularly in FIG. 3. The land portions of the wheels may be heated by any suitable means so that the webs are heat sealed together to form a series of spaced loops in which are carried the preforms 14.

The webs 40 used may be of any suitable material, including a heat sealable synthetic plastic such as polyethylene or any other suitable plastic which may be coated with a pressure sensitive adhesive so that the two webs may be joined together on contact over the interval of their length between adjacent preforms. When assembled to webs 40, the preforms 14 have their longitudinal axes substantially parallel to the surfaces of webs 40, as illustrated in FIG. 3. While in the embodiment shown, the preforms are captured between a pair of webs, it will be readily apparent to those skilled in the art that preforms 14 could also be attached at spaced locations along the length of a single web by a suitable bonding agent or heat sealing technique.

In forming the belted preforms, the winding apparatus continues to rotate until the preform-web composite is wound turn-on-turn about the hub of the winding drum until the reel is fully loaded. The web is then severed, an empty reel fitted onto the winder shaft 32 and the process continued. On removal from the winder shaft 32, a charged reel is enclosed within a shipping and storage container, as shown at 60 in FIG. 5, which may be substantially moistureproof in the sense that the cover is hermetically sealed to the container body when the synthetic plastic of the preforms is hygroscopic in nature. In the latter instance, if the preform were exposed to a humid environment, occluded moisture absorbed by the plastic would vaporize when a preform 14 is reheated to molding temperature at the blow molding station and create undesirable bubbles in the preform. The drum-wound, belted preforms so packaged can be indefinitely stored, permitting the maintenance of a large preform inventory which can be used at any time at the same location, or can be sold and shipped to any other location and thus are adapted to be handled as any other article of commerce.

When it is desired to produce containers using the belted preforms, it is a simple matter to remove a loaded reel from its storage and shipping container 60 and feed the outer end of the preform web to a suitable stripping device whereby with the application of a suitable solvent, heat, or by the use of a severing mechanism, the individual preforms are sequentially separated from the plastic web and fed rapidly into a heating device, such as the heating and blowing tables disclosed in U.S. Pat. No. 3,599,280. In these units, the preform is heated sufficiently to enable it to be blow molded into the final container or bottle configuration.

Having thus described my invention, what is claimed is:

1. As an article of manufacture, belted preforms comprising a belt carrying synthetic plastic preforms hygroscopic in nature for use in blow molding plastic containers, said preforms having molded finishes formed adjacent one end and being situated at longitudinally spaced locations along the length of said belt with their longitudinal axes substantially parallel to the surface of said belt, said belt comprising a pair of synthetic plastic webs bonded together in the interval between adjacent preforms and forming a retaining loop around each of said preforms, said belted preforms being wound on a reel and disposed in a hermetically sealed container to limit moisture from being absorbed by the synthetic plastic preforms thereby minimizing the formation of bubbles causes by any moisture present when the preforms are reheated for blow molding.

* * * * *